United States Patent

[11] 3,619,064

[72] Inventors Robert S. Brooks
  Redondo;
  Lee O. Heflinger, Torrance, both of Calif.
[21] Appl. No. 760,572
[22] Filed Sept. 18, 1968
[45] Patented Nov. 9, 1971
[73] Assignee T.R.W. Inc.
  Redondo Beach, Calif.

[54] MOIRE GAUGING SYSTEMS
  28 Claims, 4 Drawing Figs.
[52] U.S. Cl. .................................. 356/109, 356/156
[51] Int. Cl. .................................... G01b 9/02, G01b 11/10
[50] Field of Search ........................ 356/106–113, 156; 350/3.5; 351/6

[56] References Cited
  UNITED STATES PATENTS
  3,264,932  8/1966  Hendricks ............... 351/6 X
  3,477,284  11/1969  Schwallie et al. ........ 73/88

OTHER REFERENCES
" Photographic Reproduction of Scales in Moire Fringe Applications," Interferometry; National Physical Laboratory; 1959; Burch.
" Investigation of Hologram Techniques;" 1965; Leith et al.

Primary Examiner—Ronald L. Wilbert
Assistant Examiner—Conrad Clark
Attorneys—Daniel T. Anderson, Edwin A. Oser and Jerry A. Dinardo ABSTRACT: A moire gauging system for measuring deviations of complex surfaces of a master compared to a replica thereof or of a master compared to a deformed or vibrating master. To this end, optical fringes are generated interferometrically to project substantially plane sheets of light parallel to each other onto the object to be measured. There fringes on the master can be recorded photographically or by creating a hologram, for example, and compared to the replica, or deformed master or the like which is also illuminated with the same fringe pattern. Distinctions between the two objects to be compared can be detected and measured by the resulting moire pattern.

Lee O. Heflinger
Robert E. Brooks
INVENTORS

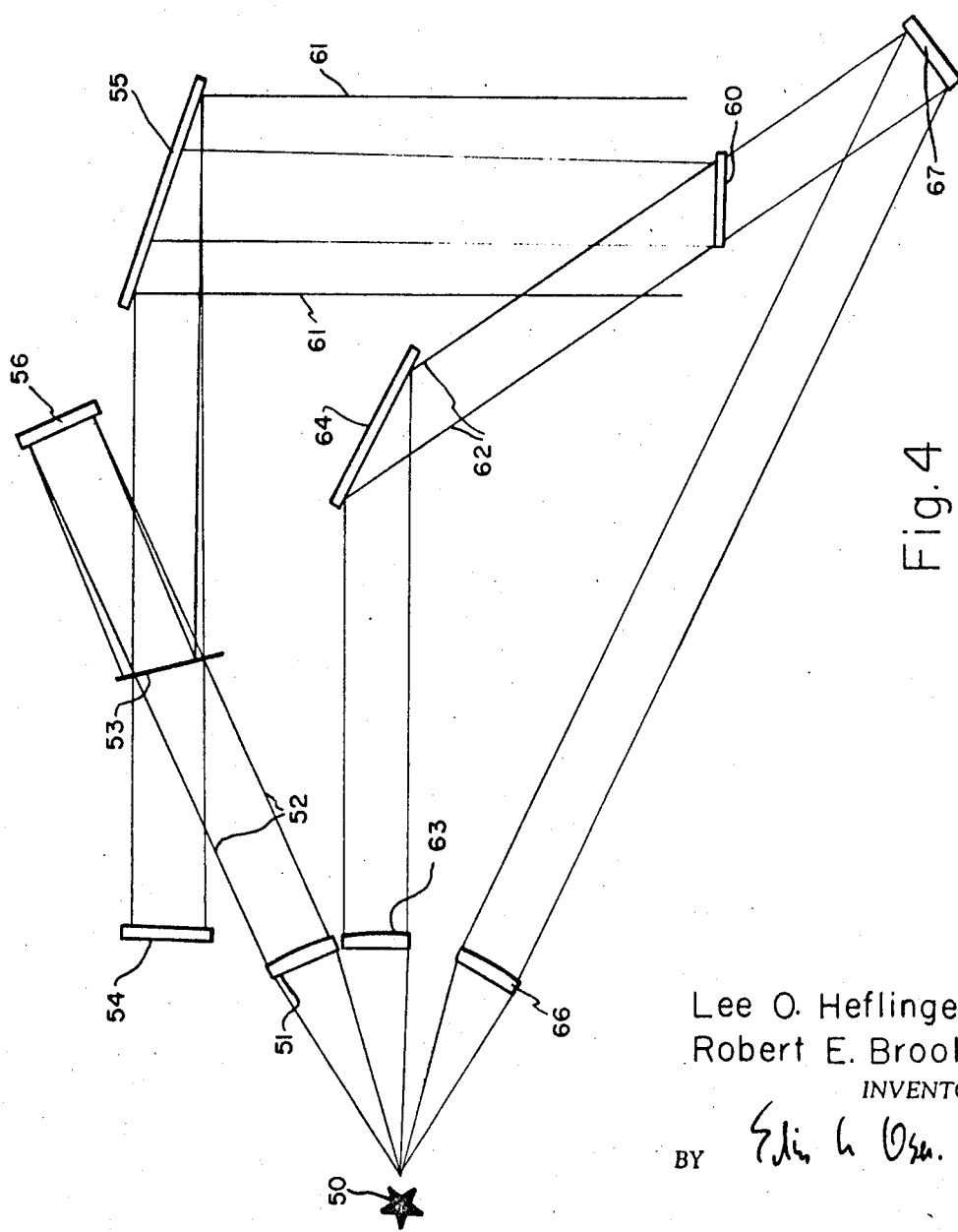

MOIRE GAUGING SYSTEMS

BACKGROUND OF THE INVENTION

This invention relates generally to gauging systems and particularly relates to a system for comparing an object to itself or to a replica by illuminating both articles successively with an interferometrically generated fringe pattern.

It is known to carry out precision measurements on complex surfaces by means of moire patterns. Moire patterns may be generated, for example, by comparing two displaced identical grille patterns. Accordingly, the moire pattern may be compared to the beat frequency which results from mixing two electrical waves by a nonlinear detector.

This is conventionally effected by placing, for example, a grille pattern behind a transparent cell and viewing the cell through a similar grille placed in front of the cell. This permits to detect or observe irregular changes, for example, of the density gradient of a fluid contained in the cell. A similar technique has been used for measuring distortions of an object due to mechanical stress. To this end, a grille pattern may be painted on the object and the object viewed against a similar grille. However, these known techniques have certain limitations. Unless the object is transparent it cannot be viewed through two grille patterns between which the object is located. On the other hand, to paint the object with a grille pattern may be difficult and tedious.

It is accordingly an object of the present invention to provide a moire gauging system which makes use of interferometrically generated fringe patterns.

Another object of the present invention is to provide a moire gauging system of the type disclosed which permits the rapid and inexpensive comparison of a replica with a master such as a master turbine blade to a replica thereof.

A further object of the present invention is to compare a master with either itself or with a replica by making use of a hologram of the master illuminated with the predetermined fringe pattern.

SUMMARY OF THE INVENTION

In accordance with the present invention there is provided a moire gauging system which permits to compare a primary object to a secondary object. The primary object may be a master article while the secondary object may be a replica of the master, or else it may be the master itself in a deformed, stressed or vibrating state. This is effected essentially by making use of an interferometrically generated fringe pattern.

To this end, there is provided a source of monochromatic light which may preferably be a laser and which develops a first beam of coherent light. Optical means in combination with the same light source are used for developing a second beam of light, which must be coherent with the first beam. The two beams form a predetermined angle with each other for illuminating a primary object with a predetermined fringe pattern. This fringe pattern is created by interference of the two light beams. It consists of light maxima and minima so that a set of light maxima is contained in a surface. These light maxima are contained in a plane provided they are generated by two parallel light beams. These planes exist parallel to each other. On the other hand, if the light maxima and minima are created by two divergent beams, the light maxima are found in sets of hyperbolical surfaces. These planes or sheets of light are disposed substantially parallel to each other, the spacing between the adjacent planes or sheets of light being determined by the angle which the two light beams form with each other. All this may be effected by means of many well-known interferometers.

Finally means are provided for making a record of the primary object with the fringe pattern projected thereon. This may, for example, be effected by making a photograph of the illuminated primary object or by preparing a hologram. However, other recording means may be utilized instead, as will be more fully explained hereinafter. In any case, the recording of the primary object illuminated with the fringe pattern may now be viewed together with a secondary object. Accordingly the recording of the primary object may be compared with the secondary object illuminated with the same fringe pattern. If there is any deviation between the two objects, a moire pattern is generated. This may be measured to gauge precisely any deviation of shape between the two objects.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 3 is a schematic representation of an alternative arrangement for generating a fringe pattern and projecting it on an object and for photographing the object with one or more cameras; and FIG. 4 is a schematic representation of a modified interferometric arrangement embodying the present invention for recording a hologram of an object illuminated by an interferometrically generated fringe pattern.

DESCRIPTION OF THE PREFERRED EMBODIMENTS

Figure 1:
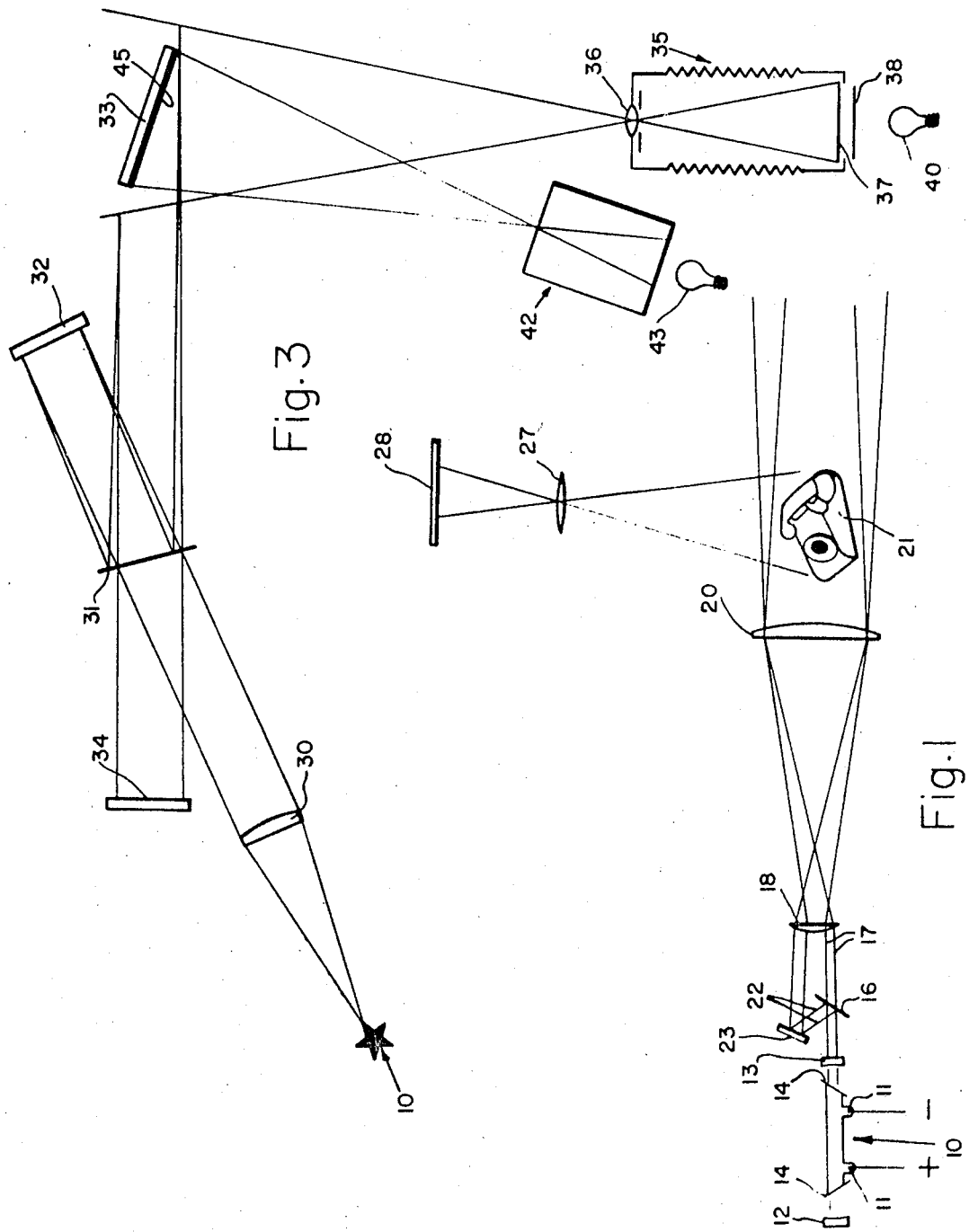
FIG. 1 is a schematic representation of an interferometric arrangement for generating fringe patterns to illuminate an object and to observe the thus illuminated object in accordance with the present invention.

Referring now to the drawings and particularly to FIG. 1, there is illustrated schematically an interferometric arrangement according to Young for producing a desired fringe pattern and for utilizing it to compare a master object with itself or with a replica. The interferometric arrangement of FIG. 1 includes a light source generally shown at 10. The source 10 should be a monochromatic light source for developing a spatially coherent light beam. This may, for example, consist of a mercury arc containing only the mercury isotope of atomic weight 198. However, preferably, the light source 10 consists of a suitable laser. This may, for example, be a solid or preferably a gaseous laser such as a helium-neon laser or an argon laser. As shown in FIG. 1, the laser 10 may have a pair of electrodes 11 on which a suitable potential is impressed to create a gas discharge. Two mirrors 12 and 13 may be provided at the two ends of the elongated laser 10, mirror 12 reflecting substantially all of the light, while mirror 13 transmits a portion of the light. The laser 10 itself may be provided with two end windows 14 which extend at the Brewster angle. Accordingly only light is permitted to leave the laser 10 which is polarized in a certain direction.

Light normally leaves a laser whether it is a solid laser or a gaseous laser in a narrow, substantially parallel beam. Accordingly, normally lenses are not needed. However, if it should be desired to increase the diameter of the beam, a suitable lens may be used. The light beam from the laser is now split into two beams by a beam splitter 16 which may consist, for example, of a lightly silvered mirror which partially reflects and partially transmits the light, or alternatively, of a wedge of glass. A wedge may be used for this purpose because the light from the unwanted reflection is directed away from the desired light path. One of the two beams is designated 17 and passes through a planoconvex lens 18 for enlarging the beam which may be made parallel by another planoconvex lens 20 for illuminating an object 21 which, as shown, may be a telephone. The other beam 22 reflected from the beam splitter 16 is again reflected by a mirror 23 and also passes through the telescope lens 18 and the second lens 20 onto the object 21.

Accordingly, there are generated two separate light beams of monochromatic light which are coherent with each other. The two light beams form an angle with each other which controls the spacing of the fringe pattern created at the object 21. In other words, the two light beams obtained by beam splitter 16 and the mirror 23 interfere with each other to project an electromagnetic or light field with periodically varying light amplitudes. Obviously maxima of the light amplitudes correspond to the presence of the light sheets created thereby and the minima correspond to the absence of light. These light fringes or sheets of light may be visualized as extending in a surface. As pointed out before these surfaces, for example, may be planes which are substantially parallel to each other and bisect the angle between the two light beams 17 and 22. This is assuming that the fringes are made by the interference of two parallel beams. If these beams should be divergent, the light fringes or maxima extend along hyperbolic surfaces. When projected on the object, they delineate a contour pattern corresponding to the complex surface of the object.

The distance $d$ between two consecutive sheets of light is given by the following formula $$d = \lambda/2 \sin \alpha/2 \quad (1)$$

where $\lambda$ is the wavelength of the light and where $\alpha$ is the angle between the two light beams.

Figure 2:
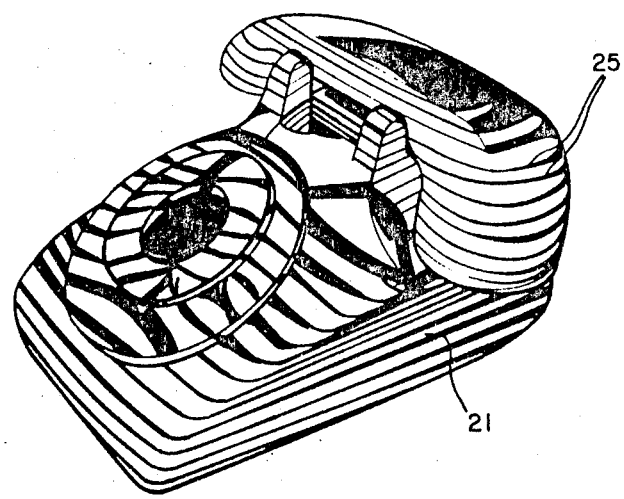
FIG. 2 is a view in perspective of a telephone on which a fringe pattern has been projected in accordance with the invention.

The resulting fringe pattern has been shown in FIG. 2, which again illustrates the telephone 21. The dark shadow lines 25 are clearly shown on the telephone and are separated by what has been called sheets of light. It is quite apparent how the fringe pattern of FIG. 2 has been purposely made very wide, that is, on the order of a quarter inch. It will be understood that for most purposes a much smaller separation between the dark shadow 25 will be used, depending on the size of the object and the accuracy desired. In other words, the fringe spacing $d$ may be made, for example, 7 mils by adjusting the angle $\alpha$ to a fraction of a degree.

Preferably the fringe pattern is viewed normal to the light sheets. This may, for example be done by a biconvex lens 27 and a ground glass plane 28 on which the object may be viewed. Alternatively the ground glass plane 28 may be replaced by a film for taking photographs of the object 21.

For example, the present invention may be practiced as follows. A master object 21 is illuminated by source 10 to create a fringe pattern thereon. A photographic plate or film may be positioned in lieu of the ground glass plate 28 to take a photograph of the master. After the photosensitive material such as a photographic plate or film has been properly exposed, developed, fixed and dried, it is carefully repositioned at the exact plane where the picture was previously taken. Thereupon the master 21 may be removed and a replica thereof substituted. This is again illuminated with the same two light beams 17 and 22 to create the fringe pattern. The fringe pattern on the replica of the master may then be viewed through the photograph 28 which had previously been taken of the master. The master may, for example, be a turbine blade and another, newly manufactured turbine blade may be compared to the master turbine blade.

Accordingly if there is any deviation of the surfaces of the master compared to that of the replica a moire pattern will be generated. When the illuminated master or replica are viewed normal to the direction of the light sheets the interpretation of the moire fringes is particularly simple. However where the viewing is not normal to the light sheets a more complex formula must be used and this formula must be evaluated for each point on the surface. This may not be necessary in all cases. For example, where it is desired to make a replica of a turbine blade to conform to a master blade, all that is necessary is to form the replica turbine blade until the moire fringes disappear. The sensitivity of the setup may have to be checked once and for all to make sure that there are sufficient moire fringes corresponding to the desired tolerance. In other words, what is important is the spacing between the surfaces containing the light maxima, as well as the general geometry, that is, the angle at which the fringes are viewed. The absence of any moire fringes generally indicates that the master and secondary object are within the desired tolerance.

Where the moire fringe pattern must be quantitatively evaluated the following formulas may be used. Let $\delta$ denote the magnitude of the surface displacement along the viewing direction required to produce one moire fringe. Then $$\delta = d/\cos \Phi, \quad (2)$$

where $\Phi$ is the angle between the normal to the light sheets and the viewing directions. The distance between the light sheets is denoted by $d$. If one desires the magnitude of the component of surface displacement normal to the surface, which is required to produce one moire fringe, denoted hereby $\Delta$, the formula is $$\Delta = d \cos \psi/\cos \Phi, \quad (3)$$

where $\psi$ is the angle between the surface normal at the point under observation to the viewing direction.

It will also be understood that a master may also be compared to itself, for example, where the master undergoes distortion due to applied mechanical stress. The amount of distortion may be measured similarly where the master is made to vibrate. The distortion due to the vibration may be measured at different instants of time.

Another embodiment of the present invention is illustrated in FIG. 3 to which reference is now made. This makes use of a Twyman-Green interferometer. It will be appreciated that other conventional interferometers may be used instead for generating two coherent light beams forming a small angle with each other. This may be effected, for example, by the single mirror of Lloyd or with the well-known two or three mirror arrangements of Fresnel. The apparatus of FIG. 3 includes a monochromatic light course schematically shown at 10 which may be formed into a beam by a planoconvex lens 30. However, as indicated previously, a lens may not be needed but serves the purpose to increase the diameter of the light beam. The beam is split by a beam splitter 31 which permits a portion of the light to pass and be reflected by a mirror 32. Thence the light is reflected back to the beam splitter 31 and onto an object 33. Another portion of the light beam is reflected by the beam splitter 31 onto a mirror 34 and thence back through the beam splitter 31 onto the object 33.

Accordingly two coherent light beams are created forming a predetermined angle which determines the distance $d$ of formula (1). The fringe pattern generated on the master object 33 may now be photographed by means of a camera 35, having a biconvex lens 36 for focusing an image of the object 33 at a plane 37 which may be a photosensitive plateholder.

In the manner previously explained the object 33 may now be replaced by another or secondary object which is to be compared to the master. Now the secondary object 33 may be viewed through the previously made photograph located at the plane 37. To this end, a Fresnel lens 38 may be used with advantage. This is a substantially flat lens which is particularly adapted for viewing both the photograph 37 and the object 33.

Many modifications of this procedure in accordance with the present invention are possible, which will now be explained by means of FIGS. 1 and 3.

For example, instead of viewing a secondary object such as a replica of the master or the stressed master, through the photograph of the master, it is also feasible to project a photograph of the master back onto the object. This may, for example, be accomplished by replacing the developed photograph in the plate holder of camera 35. This photograph is then projected onto the object 33 by means of a suitable light source indicated at 40. This could be any ordinary source of white light and it should be understood that the light of source 40 neither has to be monochromatic nor coherent.

Alternatively, it is feasible to make two separate photographs viz, one of the master and one of the object to be compared with the master, both being illuminated with the fringe pattern of the two light beams. To this end, the camera 35 may be used to take the two photographs successively at the plane of the plateholder 37. These photographs may then be compared directly by superimposing them to determine the presence or absence of a moire pattern. The presence of a moire pattern would, of course, indicate differences in shape between the original and the secondary object.

Instead of making two separate photographs of the primary and secondary objects as discussed above it is also possible to utilize a single photographic plate and to record both the master and the secondary object on the photographic layer. In other words, this amounts to a double exposure of the plate or film. By viewing this doubly exposed plate, any moire pattern that may exist may be easily discovered.

As mentioned above it is also possible to make a time exposure of the master while the master undergoes a change of shape. This may, for example, be caused by subjecting the master to stress or by causing it to vibrate. Again it is feasible to project an image of the original master and of the distorted master on the same photographic plate and then view the moire pattern of the resulting negative. Besides recording periodically vibrating objects, this procedure may also be used for measuring statistical changes of an object that is subject to random changes.

A vibrating object may also be effectively photographed by means of a pulsed laser. In other words, the light source here may be repeatedly pulsed and for each pulse of light a separate photograph may be taken or else a multiply exposed plate may be made.

It is, of course, also feasible to make a photograph of a master illuminated by interference fringes and to compare this photograph to the deformed master itself.

It is furthermore possible to compare a scale model with the full-scale object. This may, for example, be effected by enlarging a photograph of the scale model and projecting it back on the full-sized object. Alternatively, instead of making a new, blown-up photograph of the original photograph, it is feasible to use a lens which enlarges the photograph of the scale model so that it may be projected in proper size on the full-scale object.

As shown, particularly in FIG. 3, it is feasible to take several photographs from different angles of a master. To this end, there may be provided a second camera 42 which may be identical with camera 35 and which has been shown schematically. The two cameras 35 and 42 form a predetermined angle as viewed from the object 33. In this case, the moire fringe pattern may be formed directly on the secondary object. This may be done by projecting the previously recorded photographs back through the two cameras 35 and 42 onto the secondary object. To this end, the camera 42 may be provided with its own white and noncoherent light source 43 to project back a separate fringe pattern through each of two or more separate cameras. This procedure has the advantage that it eliminates the necessity of using a laser for the illuminating of the secondary object such as a replica with its attendant mirrors, beam splitters and lenses. It also eliminates the requirement of a laser source for the light sources 40 and 43 which may radiate ordinary white and noncoherent light. It will be understood that more than two cameras may be used if desired.

In accordance with the present invention it is not necessary to take a photograph of a master illuminated with the fringe pattern as explained in connection with FIGS. 1 and 3. Instead of that the master 33 may be coated with a photosensitive layer, such as a photographic emulsion as shown schematically at 45. After the photosensitive layer 45 has been exposed to the fringe pattern it may be developed. Now the moire pattern may be directly viewed on the subject. This procedure requires that the object be coated with the photosensitive material. On the other hand, there is no necessity to use a camera such as shown at 35 or 42. Furthermore, this arrangement eliminates any problem that may be caused by lack of depth of field where the fringes may be very fine and the object may be very large. However it should be noted that this procedure is only useful for comparing a master to itself. In other words, this permits to view directly the distortion of the master. It cannot be used for comparing replicas to a master because the photosensitive layer is on the master itself.

Instead of using photographs for comparing moire patterns it is also feasible to make use of holographic techniques. This eliminates the problem which is normally caused by a limited depth of focus. In addition it is possible to use very fine distances between successive maxima of light intensity. In other words, the distance $d$ of formula (1) may be made very small, as small as a wavelength of light. This makes possible higher sensitivity, that is, it permits the detection of smaller distortions. This is particularly true where the object has a complex surface in three dimensions.

In addition, the usual advantage of holography results, namely that the object may be seen in three dimensions permitting a larger degree of realism. If a wide-angle hologram with a large angle of view is used, different sides of the object may be observed by simply moving the head within the angle of view of the hologram.

This may be effected by the embodiment of FIG. 4 to which reference is now made. This includes a light source shown schematically at 50 for generating monochromatic coherent light. By means of a planoconvex lens 51 the light may be formed into a first light beam 52, which impinges on a beam splitter 53. The light reflected from the beam splitter 53 impinges on a mirror 54 and then back through the beam splitter 53 onto the object 55. A second beam of light is formed by that portion of the light passing through the beam splitter 53. The light is then reflected by a mirror 56 back onto the beam splitter 53 and also on the object 55. This is the same Twyman-Green interferometer shown in FIG. 3. A hologram of the object 55 may be now formed on the photographic plate 60 where the object beam 61 interferes with a reference beam 62. The reference beam 62 is formed by another planoconvex lens 63. The beam produced by the lens 63 is reflected by a mirror 64 onto the hologram 60.

After the hologram of a master 55 has been made in the manner just outlined, the object 55 is removed and replaced by a replica or else the master may be vibrated or stressed. The secondary object is now illuminated by the two light beams while the hologram of the master is illuminated by the reference beam 62. The viewer may observe the replica and the holographic reconstruction simultaneously superimposed by viewing the replica and the holographic image through the hologram 60. If moire patterns are observed they indicate difference of the surface patterns between the master and the secondary object such as a replica. Alternatively, the hologram may be doubly exposed by illuminating first the master and subsequently the secondary object and taking a hologram of each on the same photosensitive material. Then moire fringe patterns may be observed by viewing the doubly exposed hologram.

Instead of making two exposures on the same photosensitive material, it is also feasible to make two separate holograms by separate exposures of the master and of the replica. The two holograms may then be viewed simultaneously, that is, one against the other. Still another possibility is to project an image of the hologram of the master onto the secondary object 55. To this end, a third light beam may be generated by a plane or convex lens 66 and projected by mirror 67 through the hologram 60 onto the object 55. The real image of the master projected by means of the hologram onto the object 55 may then be compared with the fringe pattern generated on the object by the light beams.

There has thus been disclosed a system for measuring deviations of the complex surface of a master compared to a secondary object such as a replica or a vibrating master. The system makes use of interferometrically generated fringe patterns. The fringe patterns generated on the master are recorded for example, by a photographic plate, by a hologram or by coating the master with a photosensitive layer. This then makes it possible to compare the fringe pattern on the master with those of a distorted master or a replica. The gauging system of the invention is of particular use to control production of complex parts such as turbine blades. For example, it is feasible to machine the turbine blades until the moire pattern disappears.

We claim:

1. In a moire gauging system for comparing a primary object such as an opaque master article to an opaque secondary object such as a replica of a master or a deformed master:
   a. a laser for developing a first beam of coherent light;
   b. optical means including said laser for developing a second beam of light coherent with said first beam, said beams forming a predetermined angle with each other for illuminating an opaque primary object with a fringe pattern consisting of light maxima and minima, a set of said light maxima being contained substantially in a surface; and
   c. means for making a recording of the primary object with the fringe pattern projected thereon, whereby the recording of the primary object illuminated with the fringe pattern may be viewed subsequently together with a secondary object for comparing the recording with the secondary object illuminated with the same fringe pattern, thereby to gauge any deviation of shape between the two objects.

2. A gauging system as defined in claim 1 wherein said means for making a recording of the primary object consists of a photosensitive layer disposed on the surface of the primary object.

3. In a moire gauging system for comparing an opaque primary object such as a master article to an opaque secondary object such as a replica of a master or a deformed master:
   a. a laser for developing a first beam of coherent light;
   b. optical means including said laser for developing a second beam of light coherent with said first beam, said beams forming a predetermined angle with each other for illuminating a primary object with a fringe pattern consisting of light maxima and minima, a set of said light maxima being contained substantially in a surface; and
   c. means for making a photograph of the primary object with the fringe pattern projected thereon, whereby the photograph of the primary object may be subsequently compared with a secondary object illuminated with the same fringe pattern by viewing the illuminated secondary object in a direction other than that by which it is illuminated, thereby to measure any variations of the surface of the two objects.

4. A gauging system as defined in claim 3 wherein means are provided for illuminating the secondary object with the same fringe pattern as was the primary object and for directly comparing it with said photograph.

5. A gauging system as defined in claim 3 wherein means are provided for projecting the photograph of the primary object back onto the secondary object illuminated with the same fringe pattern.

6. A gauging system as defined in claim 3 wherein means are provided for making simultaneously several photographs of the primary object with the fringe pattern projected thereon, said photographs being taken at predetermined angles with respect to the primary objects.

7. A moire gauging system for comparing an opaque, three-dimensional primary object such as a master article to an opaque, three-dimensional secondary object such as a replica of a master or deformed master, said system comprising:
   a. a laser for developing a first beam of coherent light;
   b. optical means including said laser for developing a second beam of light coherent with said first beam, said beams forming a predetermined angle with each other for illuminating a primary object with a fringe pattern consisting of light maxima and minima, a set of said light maxima being contained substantially in a surface;
   c. means for making a photograph of the primary object with the fringe pattern projected thereon; and
   d. means for subsequently making a photograph of the secondary object with the same fringe pattern projected thereon, whereby the photographic recording of the two objects may be compared and any deviation of the two objects may be determined from the resulting moire pattern.

8. A gauging system as defined in claim 7 wherein the photograph of the primary and of the secondary objects is made on the same photosensitive layer.

9. A gauging system as defined in claim 8 wherein the secondary object is the master article and wherein said photographs of said object are taken at two separate times.

10. A gauging system as defined in claim 7 wherein said photographs of said objects are directly compared.

11. A gauging system as defined in claim 7 wherein one of said objects is a full-scale article and the other a scale model of the article, and wherein means are provided for magnifying the photograph of the scale object so that it matches the size of the photograph of the full-size object.

12. In a moire gauging system for comparing an opaque, three-dimensional primary object such as a master article to an opaque, three-dimensional secondary object such as a replica of a master or a deformed master:
   a. a laser for developing monochromatic light;
   b. means for pulsing said laser to generate a first beam of coherent monochromatic light having a predetermined time duration;
   c. optical means including said laser for developing a second beam of light coherent with said first beam, said beams forming a predetermined angle with each other for illuminating a primary object with a fringe pattern consisting of light maxima and minima, a set of said light maxima being contained substantially in a surface; and
   d. means for making a photograph of the primary object with the fringe pattern projected thereon, whereby the photograph of the primary object may be subsequently compared with a secondary object illuminated with the same fringe pattern for measuring any variations of the surface of the two objects, the comparing being effected in a direction other than that by which the secondary object is illuminated with said same fringe pattern.

13. In a moire gauging system for comparing an opaque, three-dimensional primary object such as a master article to an opaque, three-dimensional secondary object such as a replica of a master or a deformed master:
   a. a laser for generating monochromatic light for developing a first beam of coherent light;
   b. first optical means including said laser for developing a second beam of light coherent with said first beam, said beams forming a predetermined angle with each other for illuminating a primary object with a fringe pattern consisting of light maxima and minima, a set of said light maxima being contained substantially in a surface;
   c. second optical means including said laser for developing a reference beam of light coherent with said other beams and projecting it on a predetermined plane; and
   d. means for making a hologram in said predetermined plane of the primary object with the fringe pattern projected thereon, whereby the hologram of the primary object may be subsequently compared with a secondary object illuminated with the same fringe pattern for measuring any variation of the surface of the two objects, the comparing being effected in a direction other than that by which the secondary object is illuminated with said same fringe pattern.

14. A gauging system as defined in claim 13 wherein means are provided for viewing the secondary object illuminated with the same fringe pattern through the hologram of the primary object.

15. A gauging system as defined in claim 13 wherein means are provided for projecting light through the hologram onto the secondary object with the same fringe pattern thereon for comparing the two objects.

16. The method of comparing the contour of an opaque, three-dimensional primary object such as a master article to that of an opaque, three-dimensional secondary object such as a replica of a master or a deformed master by utilizing a moire pattern, said method comprising the steps of:

a. generating two coherent laser beams of monochromatic light forming a predetermined angle with each other and projecting them on a primary object for illuminating the primary object with a fringe pattern consisting of light maxima and minima, a set of light maxima being contained substantially in a surface; and b. recording the primary object with the fringe pattern projected thereon, whereby the recording of the primary object may be subsequently compared to a secondary object illuminated with the same fringe pattern to generate a moire pattern indicative of any variation of shape between the two objects, the comparing being effected in a direction other than that by which the secondary object is illuminated with said same fringe pattern.

17. The method as defined in claim 16 wherein the primary object with the fringe pattern projected thereon is recorded by making a photograph thereof.

18. The method as defined in claim 17 wherein the photograph of the primary object is directly compared with the secondary object illuminated with the same fringe pattern.

19. The method defined in claim 17 wherein the photograph of the primary object is projected back on the secondary object illuminated with the same fringe pattern.

20. The method as defined in claim 17 wherein several photographs of the primary object are taken at different angles with respect to the primary object.

21. The method of comparing the contour of an opaque, three-dimensional primary object such as a master article to that of an opaque, three-dimensional secondary object such as a replica of a master or a deformed master by utilizing a moire pattern, said method comprising the steps of:

a. generating two coherent, collimated laser beams of monochromatic light forming a predetermined angle for illuminating the primary object with a fringe pattern consisting of light maxima and minimal, each set of light maxima being contained substantially in a plane, the planes being disposed substantially parallel to each other;

b. making a photograph of the primary object with the fringe pattern projected thereon; and c. subsequently making a photograph of a secondary object with the same fringe pattern thereon, whereby the photographs of the two objects may be compared and whereby the presence of a moire pattern indicates a deviation of the contours of the two objects.

22. The method as defined in claim 21 wherein the primary and secondary objects are photographed on the same photosensitive layer.

23. The method as defined in claim 21 wherein the secondary object is the master article and wherein the master article is photographed on the same photosensitive layer at two separate times.

24. The method as defined in claim 21 wherein the photographs of the two objects are directly compared.

25. The method as defined in claim 21 where one of the objects is a full-scale article and the other a scale model of the article and wherein the photograph of the scale model is magnified until its size equals that of the photograph of the full-size object.

26. The method of comparing the contour of an opaque, three-dimensional primary object such as a master article to that of an opaque, three-dimensional secondary object such as a replica of a master or a deformed master by utilizing a moire pattern, said method comprising the steps of:

a. generating two coherent, collimated laser beams of monochromatic light forming a predetermined angle with each other and projecting them on a primary object for illuminating the primary object with a fringe pattern consisting of light maxima and minima, each set of the light maxima being contained substantially in a plane, the planes being disposed substantially parallel to each other;

b. generating a third reference beam of light coherent with said other beams and projecting it onto a predetermined plane; and c. making a hologram of the primary object with a fringe pattern projected thereon in the predetermined plane, whereby the hologram of the primary object may be compared with a secondary object illuminated with the same fringe pattern for measuring any variations of the contours of the two objects.

27. The method as defined in claim 26 wherein the secondary object illuminated with the same fringe pattern is viewed through the hologram of the primary object.

28. The method as defined in claim 26 wherein the hologram of the primary object is projected onto the secondary object with monochromatic light for comparing the two objects.

* * * * *